United States Patent [19]

Kuehn et al.

[11] 3,816,895

[45] June 18, 1974

[54] CHUCK ASSEMBLY FOR FASTENERS

[75] Inventors: Donald E. Kuehn, Bay Village; John Keith Lyon, Lorain, both of Ohio

[73] Assignee: TRW Inc., Cleveland, Ohio

[22] Filed: Mar. 14, 1973

[21] Appl. No.: 341,066

[52] U.S. Cl............................29/200 P, 29/212
[51] Int. Cl............................................ B23p 19/00
[58] Field of Search........... 29/200 P, 200 J, 212 R, 29/200 R

[56] References Cited
UNITED STATES PATENTS
2,286,809  6/1942  Hutchison, Jr.............. 29/212 R X
3,754,312  8/1973  Komorek.......................... 29/200 P Primary Examiner—Thomas H. Eager
Attorney, Agent, or Firm—Allen D. Gutchess, Jr.

[57] ABSTRACT

A chuck assembly for holding fasteners is provided. The chuck assembly includes an outer, back-up shield within which is a tubular chuck having fingers terminating near an end of the shield. The space between the chuck and the shield is filled with a resilient material such as urethane molded in place. The urethane resiliently supports the chuck fingers so that they can be made of a thinner and harder material than otherwise possible when the chuck fingers alone provide the gripping power and the necessary resiliency. Consequently, a longer wearing chuck can be obtained, and the fingers are less likely to crack under stress.

9 Claims, 5 Drawing Figures

PATENTED JUN 18 1974 3,816,895
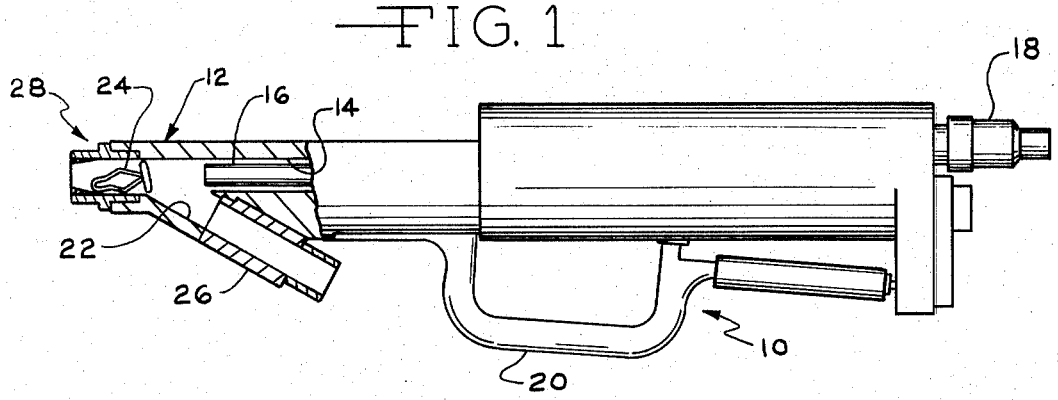
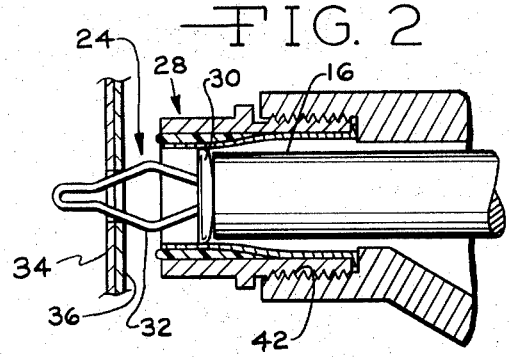
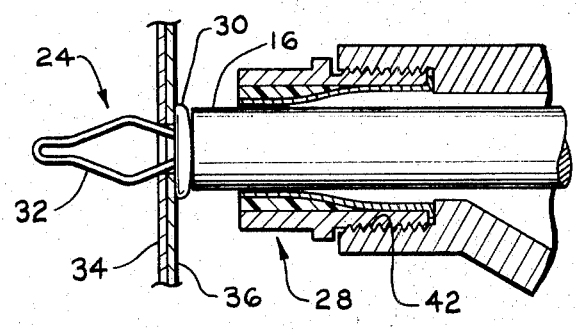
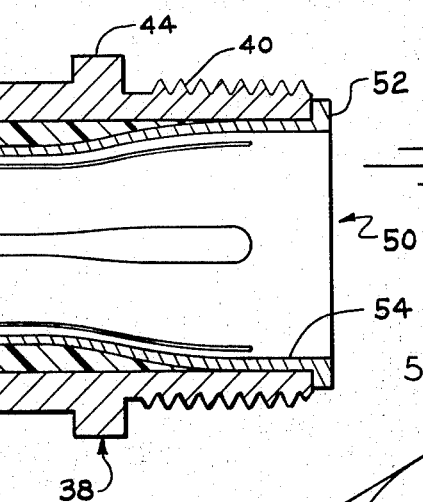
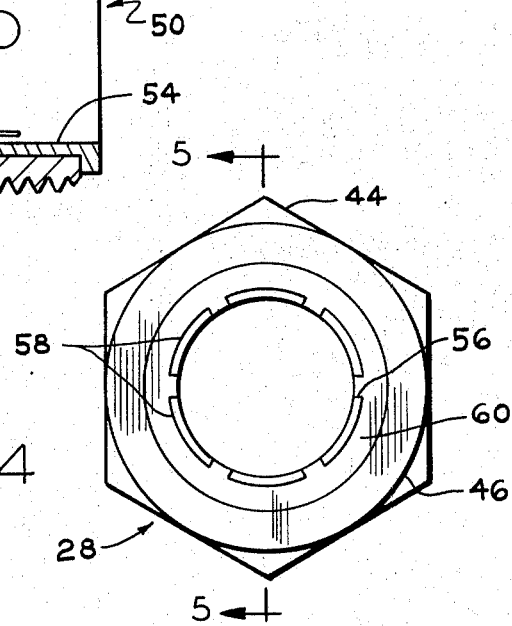

CHUCK ASSEMBLY FOR FASTENERS

This invention relates to a chuck assembly for holding fasteners and specifically to such an assembly employing molded, resilient material around the chuck.

Heretofore, chuck assemblies included outer shields with tubular chucks centrally held therein. The chucks had longitudinally-extending slots at an end thereof forming resilient fingers for holding the fastener. The extent to which the chuck or chuck fingers could be hardened for maximum wear was limited because of their resilient nature. Consequently, the chucks wore relatively fast, with concomitant frequent replacement resulting in high cost and in interruption of the operation during the time required to replace the chucks.

The present invention provides a chuck assembly including an outer shield of relatively heavy metal which provides an inner cylindrical back-up surface for the assembly. A tubular chuck is centrally located within the shield and spaced inwardly from the inner surface thereof. The chuck has slots extending longitudinally at one end thereof to provide fingers forming a smaller inner passage than at the opposite end to grip and hold the fastener. In the space between the fingers and the shield a resilient material is located which preferably fills the entire space and resiliently backs up the fingers. A plastic material such as urethane has been found suitable for this purpose and it preferably is molded in place to assure filling of the space. Because much of the resiliency required for the chuck fingers is achieved by the material and not by the fingers themselves, the fingers can be made of a thinner and harder material for increased wear. Higher side loading pressures also can be achieved with the combination fingers and molded material within a limited amount of space or area. Further, the thinner fingers are stressed to a lesser extent and consequently tend to crack or break correspondingly less.

It is, therefore, a principal object of the invention to provide an improved chuck assembly having the advantages discussed above.

Many other objects and advantages of the invention will be apparent from the following detailed description of a preferred embodiment thereof, reference being made to the accompanying drawing, in which:

FIG. 1 is a schematic side view in elevation of a fastening tool with which the chuck assembly can be used, the chuck assembly and a front portion of the tool being broken away and shown in section;

FIG. 2 is a greatly enlarged view of the chuck assembly and a portion of the tool of FIG. 1, showing a plunger and a fastener in an intermediate position;

FIG. 3 is a view similar to FIG. 2 but with the fastener in a fastened position;

FIG. 4 is a further enlarged, front end view of the chuck assembly; and

FIG. 5 is a view in longitudinal cross section taken along the line 5—5 of FIG. 4.

Referring to FIG. 1, a fastening tool indicated at 10 can be of many suitable designs or types. The tool as shown has a tubular chuck adapter 12 forming an internal passage 14 in which a plunger 16 is longitudinally moved under fluid pressure, the fluid being supplied through a rear supply fitting 18. The plunger 16 actually has three separate and distinct positions which are controlled through a trigger 20. The plunger 16 has a rear, retracted position as shown in FIG. 1, in which instance it is to the rear of a fastener inlet passage 22 which receives fasteners 24 from a tube connected to a tube fitting 26. The fasteners 24 can be blown through the tube and the fitting 26 by air in a manner known in the art. The fasteners are moved by the air at least partially into a chuck assembly 28 mounted in the forward end of the adapter 12.

The plunger 16 has a second position, as shown in FIG. 2, in which instance it has engaged a head 30 of the fastener 24 and has forced a bulbous stem 32 forwardly and beyond the chuck assembly 28. The stem 32 partially protrudes at this time through openings in adjacent plates 34 and 36 through which the fastener is to extend.

The plunger 16 has a third, forward position shown in FIG. 3, in which it extends completely out of the chuck assembly 28 with the head 30 lying contiguous with the plate 36. The tool 10 is shown more fully in a co-pending application of Kuehn and Lyon, U.S. Ser. No. 154,936, and will not be discussed in further detail.

The chuck assembly 28 according to the invention includes an outer, back-up shield 38 having a rear threaded portion 40 which is received in a threaded recess 42 of the chuck adapter 12. Immediately in front of the threaded portion 40 is a non-circular shoulder or ridge 44 which can be of hexagon shape, as shown in FIG. 4, to be readily engaged by a wrench. Forwardly of the ridge 44, the outer shield 38 has a cylindrical forward portion 46. The interior of the shield 38 has a smooth bore or cylindrical back-up surface 48 extending the length thereof. This surface can have one or more annular grooves therein to facilitate holding the molded resilient material, if desired.

The chuck assembly 28 also includes a tubular chuck 50 extending substantially completely through the bore 48. The chuck 50 has a rear annular flange 52 which abuts the rear end of the shield 38 adjacent the threaded portion 40. When the threaded portion 40 is turned into the threaded recess 42, the flange 52 abuts the bottom of the recess to help hold the chuck in position. The chuck 50 further has a large, cylindrical rear end portion 54 and longitudinally-extending forward slots 56 producing fingers or tines 58 which form a smaller diameter than the rear portion 54. These fingers also form a diameter smaller than the diameter of the head 30 of the fastener 24 so as to enable the fastener head to be gripped as it passes therethrough. When the fastener head is backed up by the plunger 16 and is frictionally engaged by the fingers 58, the fastener tends to be moved to a straight position, with the stem 32 extending parallel to the axis of the passage 14.

Heretofore, the fingers had to be quite thick in order to provide the sufficient gripping strength for the fastener head and yet the fingers also had to be resilient. As such, the chuck 50 could not be made of as hard material as desired because the hardened material in the form of thicker fingers lacked sufficient resiliency. Consequently, the chucks heretofore have had less resistance to wear than desired and had to be changed more frequently than desired. This resulted in stoppage of the operation while the chuck was replaced and resulted in high chuck costs.

In accordance with the invention, the space between the shield 38 and specifically the forward portion 46 thereof and the chuck fingers 58 is filled with a resilient material 60. This material preferably is a plastic material and specifically a commercially-available urethane has been found to be suitable for the purpose. The material 60 can be molded in place in the space between the shield and the fingers to assure proper filling of the space. In a particular example, liquid components of the urethane are mixed and poured into the space after the shield and chuck are assembled and placed in a mold. The assembly then is placed in an oven at a temperature of 250° F., by way of example, for 20 hours or for sufficient time to cure the material. A partial vacuum can be produced in the oven to evacuate air from the liquid and prevent bubbles or cavities therein. It is also possible for the resilient material 60 to be molded separately and then forced into the space between the chuck and the shield.

With the resilient back-up material 60, the fingers 58 alone need not be relied upon for the gripping force on the fasteners but the combination of the material 60 and the fingers 58 provide this force. Consequently, the fingers 58 can be of thinner material and can be of a harder material which significantly increases the chuck life. Further, with the thinner material, there is less chance for the fingers cracking and failing than heretofore. The material 60, when molded in place, can actually extend through the slots 56 and into the interior of the chuck slightly. This provides an even greater gripping force on the fasteners as long as this material is present.

Various modifications of the above-described embodiment of the invention will be apparent to those skilled in the art, and it is to be understood that such modifications can be made without departing from the scope of the invention, if they are within the spirit and the tenor of the accompanying claims.

We claim:

1. A chuck assembly for holding a fastener, said assembly comprising an outer shield having an inner surface with a substantially circular transverse cross section, a tubular chuck within said shield having fingers at one end forming a circular transverse cross section of a diameter less than that of an adjacent portion of said shield, whereby an annular space is formed between said shield and said fingers, and a resilient material filling at least a substantial portion of said space.

2. A chuck assembly according to claim 1 characterized by said resilient material being a plastic material molded in place in the space.

3. A chuck assembly according to claim 2 wherein said plastic material is a urethane.

4. A chuck assembly according to claim 1 characterized by said shield having a threaded rear portion and said chuck has an outwardly extending flange adjacent the end of said threaded portion.

5. A chuck assembly according to claim 1 characterized by said chuck having longitudinally-extending slots between said fingers and said resilient material extends into said slots.

6. In combination, a fastening tool having means forming a passage at a forward end thereof and inlet means communicating with said passage for feeding a fastener into said passage from a location behind the forward end of the tool, a chuck assembly for holding a fastener at the forward end of the tool, said assembly comprising an outer shield having means at a rear end thereof for being fastened to said passage means, said shield having an inner cylindrical surface aligned with said passage means, a tubular chuck in said shield having fingers at a forward portion thereof forming a circular, transverse cross section of a diameter less than the inner diameter of the shield surface to form an annular space between said shield and said fingers, and resilient material in said space extending between the inner surface of said shield and the outer surface of said fingers to back up said fingers and increase the grip thereof on a fastener held thereby.

7. The combination according to claim 6 characterized by said resilient material being a plastic material.

8. The combination according to claim 7 characterized by said plastic material being molded and substantially filling the entire space between said inner surface of said shield and the outer surfaces of said fingers.

9. The combination according to claim 6 characterized by said chuck having a larger inner diameter at a rear portion thereof of substantially the same size as said passage.

* * * * *